Nov. 7, 1967 AKIRA HIROTA 3,351,716

MAGNETIC ERASING CIRCUITRY

Filed July 30, 1963

INVENTOR

Akira Hirota

BY Stevens, Davis, Miller & Mosher

ATTORNEYS 3,351,716

MAGNETIC ERASING CIRCUITRY

Akira Hirota, Ota-ku, Tokyo, Japan, assignor to Victor Company of Japan, Limited, Yokohama, Japan, a corporation of Japan Filed July 30, 1963, Ser. No. 298,605
Claims priority, application Japan, Aug. 6, 1962, 37/33,594
2 Claims. (Cl. 179—100.2)

ABSTRACT OF THE DISCLOSURE

A magnetic erasing apparatus having an oscillator and a capacitor connected in parallel to an erasing head, thus forming a resonant circuit. The resonant circuit is used as an oscillator tank circuit to automatically determine the resonance frequency of the oscillator.

This invention relates to apparatus for erasing electrical signals which have been recorded on a magnetic recording medium, and has for its object the provision of such apparatus capable of effective erasure while utilizing erasing electrical power supply of very small power output.

The method used heretofore in this relation utilized merely the causing of a high frequency electrical current to flow through the erasing head, but since the erasing head itself constituted an inductive load, the reactive power was large, thus necessitating considerable power from the erasing electrical power supply.

In order to overcome this, a capacitor was connected in series or shunt with the erasing head, utilizing electrical resonance of the capacitor and the erasing head, and thus eliminating reactive power, but this had disadvantages such as in the event the Q factor of the erasing head was high, its resonance characteristic curve became sharp, making difficult the matching of the oscillation frequency of the oscillator with the resonance frequency of the erasing head and capacitor circuit.

The present invention eliminates the above-mentioned disadvantages and this will be explained in connection with the following diagrams of an embodiment of this invention.

Figure 1:
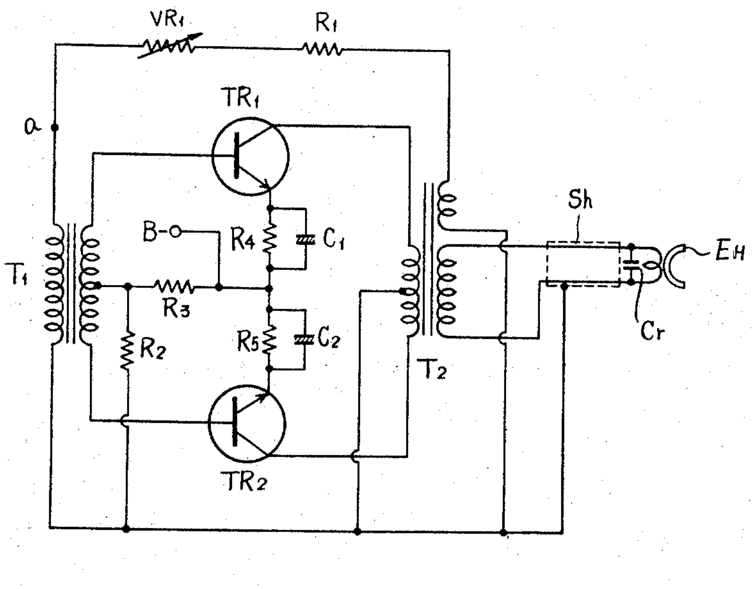
Figure 2:
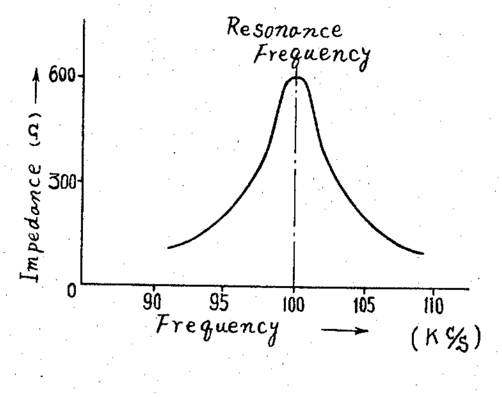

FIG. 1 is the electrical circuit diagram of an embodiment of the apparatus utilizing this invention; and FIG. 2 is an explanatory diagram of its performance.

FIG. 1, depicting an embodiment of this invention, relates to a magnetic erasing apparatus which erases at one time the entire width of a two-inch magnetic recording tape. In this diagram $T_1$ is the totalizing transformer, $TR_1$ and $TR_2$ are transistors, $T_2$ is the output transformer, $VR_1$ is the variable resistor, and these are connected as shown in the diagram with related resistors $R_1$, $R_2$, $R_3$, $R_4$ and capacitors $C_1$ and $C_2$. $S_h$ is the shielded wire line, $E_H$ is the erasing head which in the embodiment has 27 microhenrys inductance, and $C_r$ is the resonating capacitor which in this embodiment is 0.095 microfarad.

Erasing head $E_H$ and capacitor $C_r$ constituting a resonant circuit become the principal elements in the later mentioned oscillator tank circuit and its impedance versus frequency characteristic is shown in FIG. 2, and its resonant frequency, which in the embodiment is 100 kilocycles, is determined by the inductance of the erasing head and the capacitance of capacitor $C_r$.

Now, if it is considered that the circuit in FIG. 1 is cut at point (*a*), this circuit is merely that of an amplifier but the frequency characteristic of its voltage gain in this instance is that of the load impedance; that is, it is identical to the characteristic curve shown in FIG. 2. In other words, the gain becomes maximum at the resonant point. This is because there is no circuit (tank circuit, etc.) in the oscillator itself which would contribute to increase of amplification with respect to frequency. However, in the present circuit having such an electrical characteristic, with the circuit reconnected at point (*a*), if the resistance value of variable resistor $VR_1$ is decreased, positive feedback will be applied to the circuit and oscillation occurs, but the frequency will be at the resonance point where maximum gain is obtained. In other words, the above-mentioned resonant circuit will operate as the tank circuit where oscillating frequency is determined by the resonant circuit. In the practical circuit, variable resistor $VR_1$ is replaced by a fixed resistor of proper value.

Therefore, even if the inductance of the erasing head $E_H$ should change due to variations in external air temperature or changes due to passage of time, the resonant frequency and oscillation frequency will vary in an identical manner and will always coincide. Also, the output power required from the erasing electrical power supply in the present invention can be compared with that for previous apparatus by the following equation:

(1) Previous apparatus (where resonating capacitor is not empolyed)

$$P_o = \frac{V^2}{2\pi f L}$$

(2) Apparatus utilizing present invention $$P_o' = \frac{V^2}{2\pi f Q L}$$

where:

$P_o$, $P_o'$=output power of erasing electrical power supply (oscillator output)
$V$=voltage across erasing head terminals
$f$=erasing frequency
$L$=inductance of erasing head
$Q$=Q factor of erasing head.

Thus, for the erasing electrical power required by the apparatus of the present invention, it is possible to decrease it in proportion to the magnitude of the Q factor of the erasing head, and since presently used magnetic material, especially ferrite, often has a Q factor value of approximately 10 to 40, the erasing electrical power required for apparatus of the present invention can be decreased to 1/10 to 1/40 of that for previous apparatus. Moreover, if the combined impedance of capacitor $C_r$ and erasing head $E_H$ is matched to the characteristic impedance (normally 600 ohms) of the line, even better results are obtainable. If the numerical values in the above-mentioned embodiment are substituted in the aforementioned equation, the following result is obtained:

$$P_o' = \frac{60^2}{2 \times 100 \times 10^3 \times 35 \times 27 \times 10^{-6}}$$

$$\doteqdot 6 \text{ voltamperes}$$

(where $f$=100 kilocycles, $Q$=35, $L$=27 microhenrys, $v$=60 volts).

As explained above, in the present invention a capacitor is connected in parallel or series with the erasing head to constitute a resonant circuit, said resonant circuit being utilized as the tank circuit of the oscillator and thereby automatically determining the frequency of said oscillator; therefore with changes in the inductance of the erasing head or capacitance of the capacitor due to changes in ambient temperature or changes due to passage of time, the oscillator frequency varies accordingly but the circuit comprising erasing head and capacitor will operate always at its resonance frequency and thus can be utilized at the condition of maximum efficiency.

What I claim is:

1. A magnetic erasing apparatus comprising an oscillator, a resonant circuit forming a tank circuit for said oscillator, said resonant circuit having a resonant frequency and consisting of a condenser and an erase head connected in parallel, said oscillator including a feedback circuit having a variable resistor for feeding back power from said resonant circuit, said oscillator having an oscillation frequency coinciding with the resonant frequency of said resonant circuit, and said resonant circuit providing the only phase shifting circuitry in said oscillator.

2. A magnetic erasing apparatus comprising, an oscillator, a resonant circuit forming a tank circuit for said oscillator, said resonant circuit having a resonant frequency and consisting of a condenser and an erase head made of a magnetic material having a high Q connected in parallel, said oscillator including a feedback circuit having a variable resistor for feeding back power from said resonant circuit, said oscillator having an oscillation frequency coinciding with the resonant frequency of said resonant circuit, and said resonant circuit providing the only phase shifting circuitry in said oscillator.

References Cited

UNITED STATES PATENTS 3,020,357 2/1962 Nowlan ___________ 179—100.2

OTHER REFERENCES

Burstein, H. and Pollak, H. C.: Elements of Tape Recorder Circuits, Gernsback Library, Inc., New York, N.Y., 1957, pp. 157–162.

Haynes, N. M.: Elements of Magnetic Tape Recording, Prentice Hall, Inc., Englewood Cliffs, N.J., 1957, pp. 355–356.

BERNARD KONICK, *Primary Examiner.*

A. I. NEUSTADT, *Assistant Examiner.*